2 Sheets—Sheet 1.

J. M. TOTTEN.
ANTIFRICTION BOX.

No. 7,639.   Patented Sept. 10, 1850.

J. M. TOTTEN.
ANTIFRICTION BOX.

No. 7,639.

Patented Sept. 10, 1850.

UNITED STATES PATENT OFFICE.

J. M. TOTTEN, OF PEORIA, ILLINOIS.

FRICTION-ROLLER.

Specification of Letters Patent No. 7,639, dated September 10, 1850.

*To all whom it may concern:*

Be it known that I, JOSEPH M. TOTTEN, of the city and county of Peoria and the State of Illinois, have invented a new and useful Improvement in Antifriction - Boxes for Wheel-Carriages, of which the following is a full, clear, and exact description reference being had to the accompanying drawings, which forms part of this specifiuation and in which—

Figure 1:
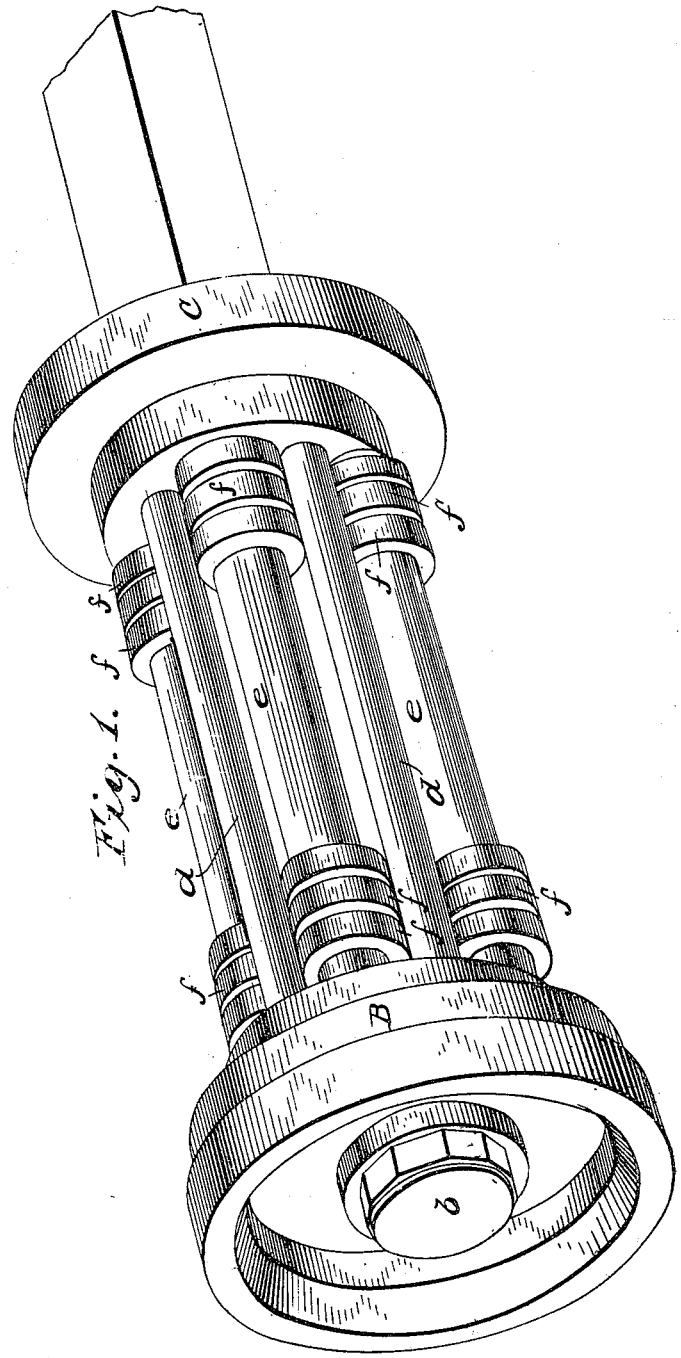
Figure 2:
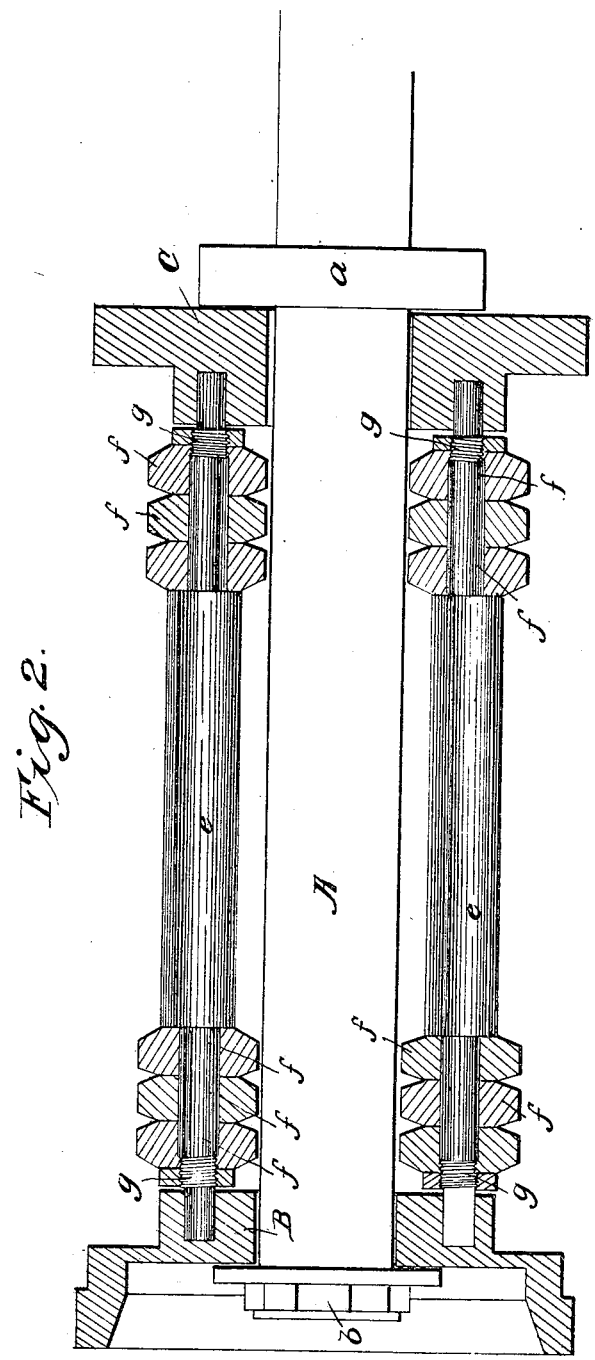

Figure 1 is a view in perspective of my improved antifriction box and Fig. 2 is a longitudinal section of the same.

My antifriction box contains a series of friction rollers placed parailel to the surface of the wheel axle on which they run, each roller is composed of annular sections fitted tightly upon a common spindle with which they ordinarily turn. If however one of these sections should meet with an obstruction that subjects it to an unusual and great amount of friction, it will be stopped perhaps until one of its sides is flattened by abrasion; all the segments may in turn be thus flattened but as they do not turn freely upon the spindle and as they are not all abraided at once their flattened sides will be so distributed round the roller as to make its general surface rough and irregular without any continuous flattened side, so that such irregular abrasion will not materially affect its general roundness or its operation, whereas when a roller, made in the usual manner in one piece, becomes flattened, it is rendered useless.

In the accompanying drawing A is the journal of the axle, it is furnished at its inner extremity with a collar $a$ and at its outer with a nut $b$ by means of which the wheel is retained upon the axle. The box is composed essentially of two disks B, C, which are connected by a series of bolts $d$ and which may also be connected by a shell which will envelope and protect the friction rollers. The latter are each composed of a spindle $e$ which runs in sockets formed in the opposite faces of the two disks, and of a series of annular sections $f$, $f$, which are fitted upon journals formed upon the spindle; these segments bear upon the wheel axle and sustain the strain of the load; they are prevented from wabbling on their spindle by means of a nut $g$ at the outer end of each set; this nut is screwed up sufficiently to force the ends of the sections against each other and jam the series against the shoulder of their journal so that they all tend to revolve with equal velocity carrying their spindle $e$ with them; but the nuts are not screwed up too tightly to prevent any one section from turning on the spindle independently of the rest, hence any hard place in the shaft that would tend to wear flat the periphery of the roller will only affect that section with which it may come in contact while the others, being independent of it, will go on turning in a proper manner. As it is almost impossible that the hard spots in an axle or any accidental obstruction should all be in a line with each other, the sections will be unequally worn and the unworn portion of one at least of each set will always be in action, hence the roller thus constructed will always perform its duty notwithstanding the irregular wear of the sections of which it is made up, and in case the motion of any one of the sections should be arrested by an intervening obstruction the rubbing of the adjacent sections which continue turning would tend to start and cause it to pass the obstruction.

In the above described antifriction box I have represented the friction rollers as each divided into six sections, but this number may be varied if necessary, and the general arrangement of the parts of the box may be varied as may be found most suitable in practice.

Having thus described my anti-friction-box what I claim therein as my invention and desire to secure by Letters Patent, is—

The friction rollers each composed of a series of separate sections held together by nuts or otherwise on a common spindle in such manner that the spindle and roller sections usually turn together, but when any obstruction intervenes to stop the movement of any one section and thus cause it to grind and flatten, the adjacent sections with the spindle continue to roll on and by rubbing against the obstructed one tend to move it past the obstruction thereby preventing continued excessive wear on any one portion of its periphery; hence the irregular wear of any of the sections will not affect the general roundness of the whole to such a degree as will materially impair the efficiency of this device as an anti-friction roller.

JOSEPH M. TOTTEN.

Witnesses:
H. B. BAY,
B. H. SKINNES.